No. 608,755. Patented Aug. 9, 1898.
H. F. COTTLE.
APPARATUS FOR STORING AND USING SOLAR HEAT.
(Application filed Dec. 11, 1897.)
(No Model.)
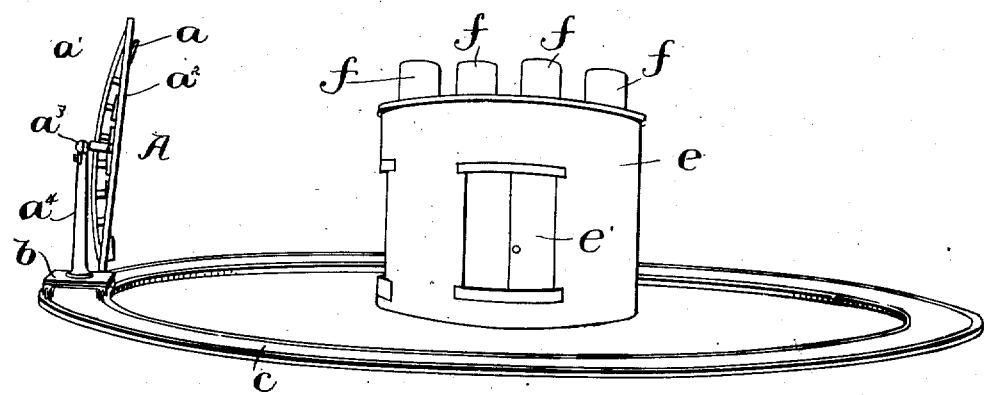
FIG. 1.
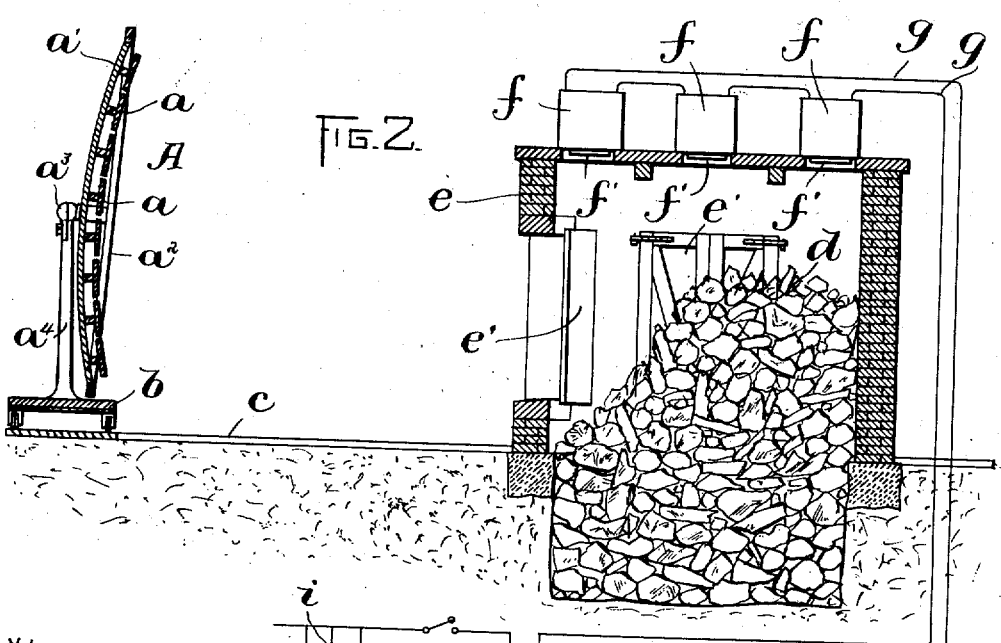
WITNESSES:
A. D. Hanson.
O. W. Pizzetti
INVENTOR:
H. F. Cottle
by Wright Brown & Quinby
attys.

UNITED STATES PATENT OFFICE.

HENRY F. COTTLE, OF BOSTON, MASSACHUSETTS, ASSIGNOR OF TWO-THIRDS TO WILLIAM CALVER, OF WASHINGTON, DISTRICT OF COLUMBIA, AND JOHN J. PRATT, OF REVERE, MASSACHUSETTS.

APPARATUS FOR STORING AND USING SOLAR HEAT.

SPECIFICATION forming part of Letters Patent No. 608,755, dated August 9, 1898.

Application filed December 11, 1897. Serial No. 661,471. (No model.)

*To all whom it may concern:*

Be it known that I, HENRY F. COTTLE, of Boston, in the county of Suffolk and State of Massachusetts, have invented certain new and useful Improvements in Apparatus for Storing and Using Solar Heat, of which the following is a specification.

This invention relates to an improved apparatus for storing and utilizing solar heat, the invention consisting in concentrating the sun's rays and causing them to fall upon a suitable heat receiving and retaining body, such as a pile of stones, and then causing the stored heat from said body to fall upon a thermo-electric generator, which converts the energy of heat into energy of electricity, and finally utilizing the electric energy in any suitable manner.

Of the accompanying drawings, forming a part of this application, Figure 1 represents a perspective view of an apparatus constructed in accordance with my invention. Fig. 2 represents a sectional view of the same, together with a diagrammatic representation of an apparatus for storing and utilizing the electric energy generated.

The same reference characters indicate the same parts in both the figures.

In the drawings the letter A designates a reflecting-condenser composed of a number of rows of flat mirrors $a\ a$, arranged upon adjustable curved bars $a'\ a'$, which are mounted in a frame $a^2$. The said frame is connected by a universal joint $a^3$ to a vertical standard $a^4$, mounted on a rolling platform or truck $b$, which travels upon a circular track $c$. At the center of the circle is a heat-reservoir, which, as here shown, consists of a pile of stones $d$, the upper portion of which is inclosed and covered by a heat-retaining house $e$, which has doors $e'\ e'$ on three sides. The walls of the house are preferably composed of or lined with fire-brick or other fireproof material, and in practice other suitable arrangements may be made to prevent the escape of heat to the outside air. A number of apertures are formed in the roof of the house $e$, and above these apertures are mounted thermopiles $f\ f$, which may be of any approved construction.

When the sun's rays are reflected and concentrated from the mirror onto the pile of stones $d$, the stones will become heated, and with a fairly powerful mirror a red heat may easily be attained. As the sun travels around from east to west, the truck $b$ upon which the mirror stands is moved, either by hand or by suitable mechanical means, around the track $c$. The doors $e'$ are thrown open in succession as the mirror moves around the house, and each is thereafter closed as the mirror moves along to a position opposite the next door. A clockwork mechanism may, if desired, be used to move the mirror-frame along the track $c$.

As the stones immediately exposed to the concentrated rays become heated their heat is communicated to the adjacent stones, and in time the whole pile, which preferably extends some distance below the surface of the ground, as shown in Fig. 2, becomes thoroughly heated. If properly insulated by a non-conducting housing, the stones will retain their heat for a considerable period of time. All of the doors $e'$ are closed at night and at other times when the sun is obscured.

The heat from the pile of stones $d$ is radiated through the apertures in the roof of the house upon the thermopiles $f$, which may be provided with metallic collecting-plates $f'$, and a current of electricity is generated, which in the arrangement here shown is carried by conductors $g\ g$ to a storage battery or accumulator $h\ h$ and from said battery is then drawn upon to light a series of lamps $i$ or to perform other electrical work.

The arrangement of the individual mirrors in the frame $a^2$ in practice is preferably such that the general inclination of the frame itself does not need to be changed throughout the day, it being merely necessary to move the mirror as a whole around the track $c$ to follow the movement of the sun from east to west.

A body of sand or merely a patch of ground may be used to store the heat instead of the pile of stones, and various other modifications, as well, may be made without departing from the spirit of my invention.

I have found by experiment that the incrustation formed in gas-retorts and commonly known as "retort-carbon" is an excellent heat-retainer and that a heat-reservoir consisting of pieces of this material is well adapted for the practice of this invention.

Having thus explained the nature of my invention and described a way of constructing and using the same, without, however, having attempted to set forth all the forms in which it may be embodied or all the modes of its use, I declare that what I claim is—

1. An apparatus of the character specified, comprising a body of heat-retaining material, a heat-insulating device or covering therefor, means for heating said body of material, a thermo-electric generator adapted and arranged to convert the energy of heat from said body into energy of electricity, and means for utilizing the electric energy.

2. An apparatus of the character specified, comprising a condenser for concentrating the sun's rays, a reservoir such as a body of stones adapted to be heated by the concentrated rays, a heat-insulating housing for said reservoir, and a thermo-electric generator adapted and arranged to convert the energy of heat from said reservoir into energy of electricity.

3. An apparatus of the character specified, comprising a body of heat-retaining solid material in a divided state, means for concentrating the sun's rays upon said body to heat the same, and a thermo-electric generator adapted and arranged to convert the energy of heat from said body into energy of electricity.

4. An apparatus of the character specified, comprising means for concentrating the sun's rays, a body of heat-retaining material adapted to be heated by the concentrated rays, a housing for said body, a door in said housing adapted to be opened to allow the concentrated rays to fall directly upon the body, and a thermo-electric generator adapted and arranged to convert the energy of heat from the body into energy of electricity.

5. An apparatus of the character specified, comprising means for concentrating the sun's rays, a body of heat-retaining material adapted to be heated by the concentrated rays, a housing for said body, and a thermo-electric generator occupying an aperture in said housing and adapted to convert the energy of heat from the body into energy of electricity.

6. An apparatus of the character specified, comprising a body of heat-retaining material, a heat-insulating housing therefor, and a condenser for concentrating the sun's rays upon the body of material, the said condenser being mounted upon a movable support and adapted to act upon the body from different directions.

7. An apparatus of the character specified, comprising a body of heat-retaining material, a heat-insulating housing constructed with a plurality of apertures and provided with doors for said apertures, and a condenser mounted upon a movable support and adapted to concentrate the sun's rays upon the body of material through the several apertures in succession.

8. An apparatus of the character specified, comprising a body of heat-retaining material occupying an excavation or recess in the ground, means for heating the body of material, and means for converting the energy of heat from said material into energy of electricity.

In testimony whereof I have signed my name to this specification, in the presence of two subscribing witnesses, this 19th day of November, A. D. 1897.

HENRY F. COTTLE.

Witnesses:
R. M. PIERSON,
C. F. BROWN.